(12) United States Patent
Brown

(10) Patent No.: US 6,273,207 B1
(45) Date of Patent: Aug. 14, 2001

(54) MOTORCYCLE SEAT

(75) Inventor: William H. Brown, Menomonee Falls, WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 09/363,792

(22) Filed: Jul. 29, 1999

(51) Int. Cl.$^7$ ........................................................ B62J 1/00
(52) U.S. Cl. ..................... 180/219; 280/290; 297/195.1
(58) Field of Search .................. 180/219; 280/288.4, 280/290; 297/195.1, 203, 214

(56) References Cited

U.S. PATENT DOCUMENTS

| | | | |
|---|---|---|---|
| 3,844,610 | * 10/1974 | Adams | 297/213 |
| 3,940,166 | * 2/1976 | Smithea | 280/290 |
| 5,558,260 | * 9/1996 | Reichert | 224/413 |
| 5,608,957 | * 3/1997 | Hanagan | 29/91.1 |
| 6,012,770 | * 1/2000 | Rubin | 297/184.11 |
| 6,070,896 | * 6/2000 | Saiki | 280/288.4 |

OTHER PUBLICATIONS

1987–1989 1340 Parts Catalog, pgs. 122–123.
1997 Motorcycles—1 page (not numbered).
1998 Star Yamaha—2 facing pages (not numbered).
1989 Custom Chrome Catalog.
1997 J & P Cycles, pgs. 21–10 and 21–11.

* cited by examiner

*Primary Examiner*—Kevin Hurley
(74) *Attorney, Agent, or Firm*—Michael Best & Friedrich LLP

(57) ABSTRACT

A motorcycle includes a frame having an aperture, and a seat having an insert member that is inserted into the aperture to at least partially substantially secure the seat to the frame. A strap defines a loop surrounding a portion of the seat. The strap is manually releasably attached to the frame by way of a coupling member and a bushing having a biasing member. The coupling member includes an opening having an enlarged clearance portion and a reduced retaining portion, and the biasing member includes a split ring constructed of spring steel. When the bushing is positioned within the retaining portion of the opening with the split ring in the second condition, the biasing member resists movement of the coupling member. Manually-operable thumb screws are provided to permit quick attachment and release of the seat to the frame.

18 Claims, 7 Drawing Sheets

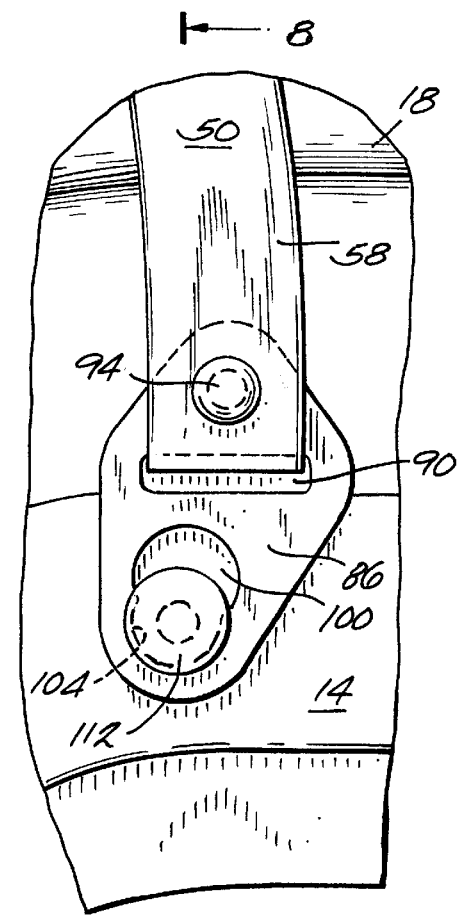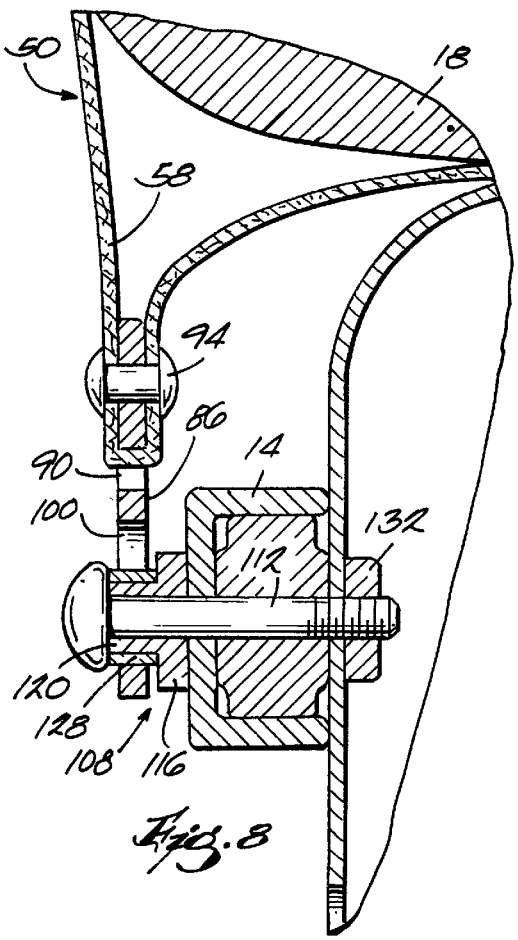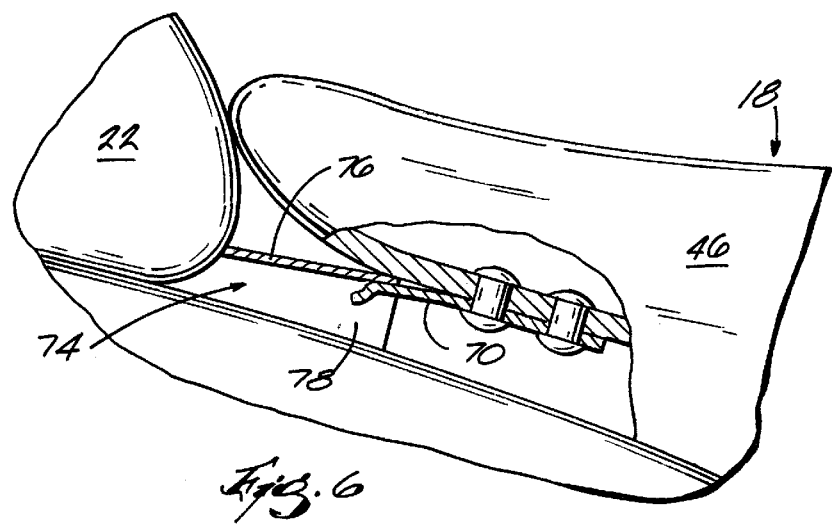

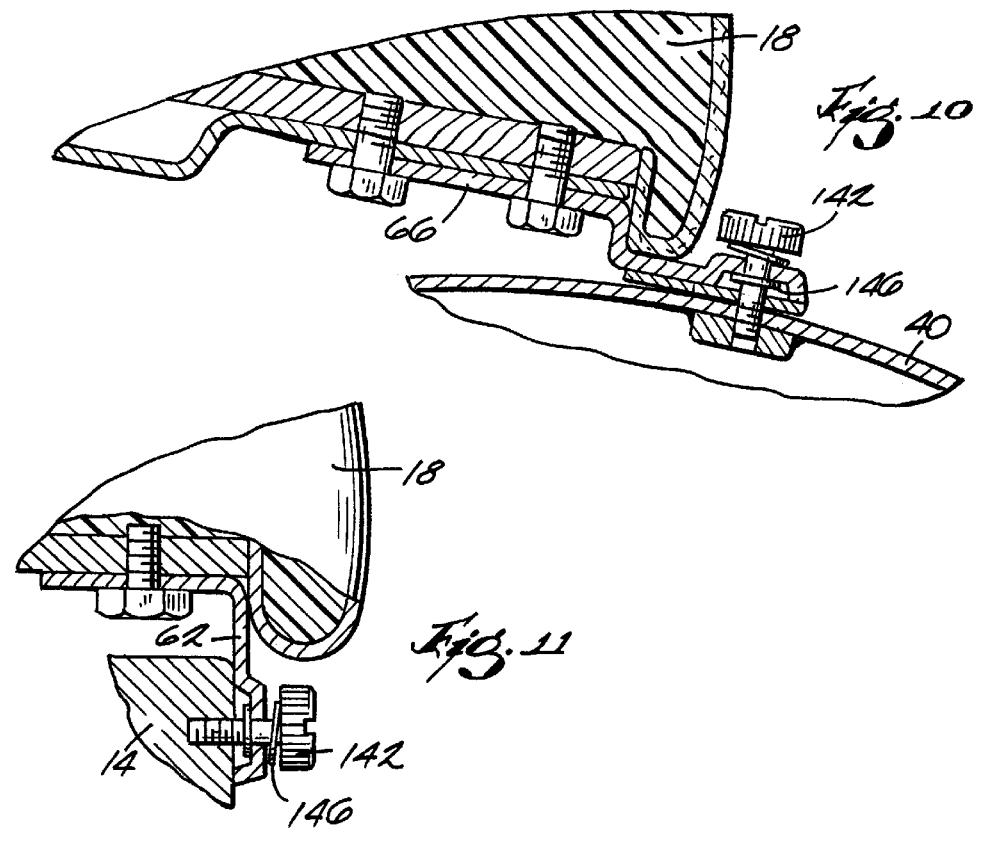
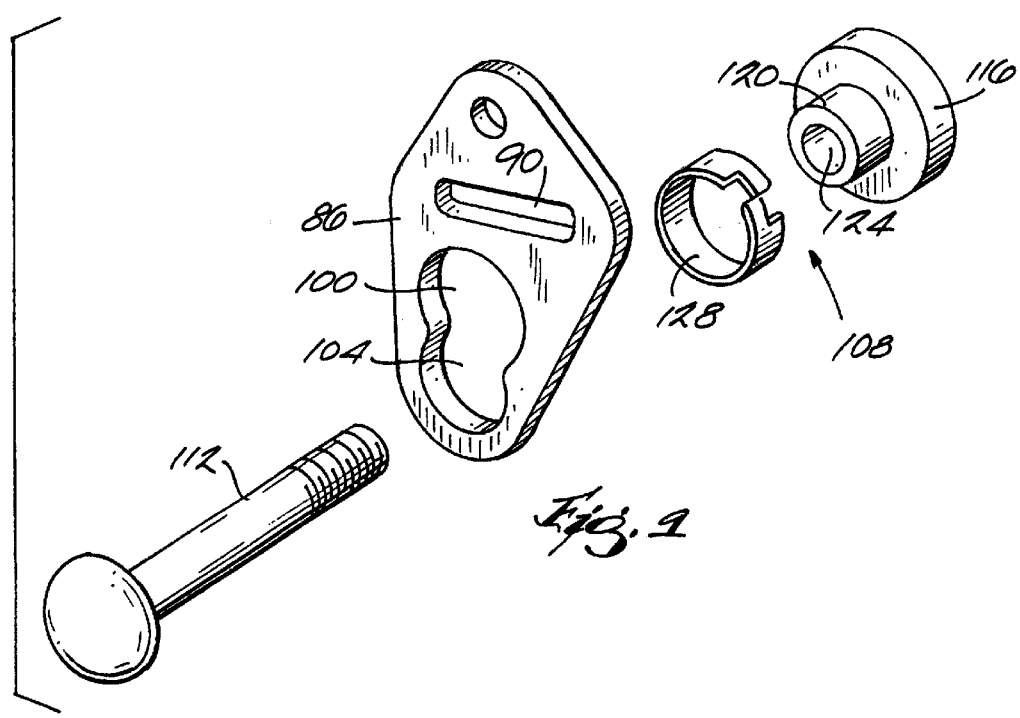

MOTORCYCLE SEAT

FIELD OF THE INVENTION

The invention relates to motorcycle seat assemblies.

BACKGROUND

Prior art motorcycles include various means for mounting the motorcycle seat to the motorcycle frame. One way that the seat has been mounted to the frame in the past is by way of a tongue mounted to the undersurface of the seat, and a loop, strap, tube, or other hollow member mounted to the backbone of the frame. The tongue is inserted into the hollow member to resist upward movement of the seat. Additionally, some prior art motorcycles include various fasteners that further mount the seat to the frame at various locations.

Many countries have safety regulations for motorcycles. One common safety regulation is the requirement of a "seat strap" on a motorcycle onto which a passenger on the motorcycle may hold. In some countries, this regulation may also require that the seat strap be strong enough such that the entire motorcycle may be picked up by the strap alone. The strap is typically affixed by fasteners to the motorcycle frame on either side of the seat, and extends across the seat Some motorcycles include a battery, fuses, a tool compartment, and other motorcycle components under the seat. In order to access these components, the seat must be moved from its operating position. Typically, prior art motorcycles permit the removal of the seat by sliding the seat from under the seat strap. Alternatively, some prior art motorcycles permit rotation of the seat to provide access to the components under the seat. A separate battery strap is often employed to hold the battery in place.

SUMMARY

Known designs calling for a hollow member mounted on the frame often give rise to particular manufacturing costs and inefficiencies. For example, the hollow member must be manufactured or purchased at some cost in addition to the cost of the motorcycle frame, and mounting the hollow member to the frame includes a manufacturing step, such as welding. Advantageously, the present invention provides a motorcycle that does not require a hollow member separate from the frame itself. This may result in production and manufacturing savings, as the separate part and separate assembly step of mounting the hollow member on the frame are not required.

The seat strap of known motorcycle designs often makes removal of the seat difficult. The seat strap is often tightly secured over the top of the seat to create a tight, compact aesthetic impression. Thus, it is often difficult to remove the seat from under the seat strap, and to insert the seat under the seat strap. Furthermore, the fasteners securing the seat to the frame often must be loosened with tools, further complicating removal of the seat. The present invention provides a motorcycle having a seat that is easily installed onto and removed from the motorcycle.

The present invention provides a motorcycle comprising a frame including a tubular portion providing structural support to the motorcycle and having an aperture, and a seat having an insert member that is positioned in the aperture. Thus, the insert member is positioned in a structural component of the motorcycle, and not a hollow member mounted to the motorcycle frame. Preferably, the insert member is mounted to an undersurface of the seat.

The motorcycle of the present invention may also include a strap extending over a portion of the seat to at least partially substantially fix the seat with respect to the frame. Preferably, a portion of the strap extends under a portion of the seat, and the strap defines a closed loop surrounding a portion of the seat such that the strap is substantially prevented from dangling into the motorcycle rear wheel or other moving parts. The strap may include a loop tightening member, such as a snap, that permits a portion of the strap to be doubled over to tighten the loop around the portion of the motorcycle seat. When it is desired to remove the seat from the loop, the snap may be disconnected to provide a sufficiently large loop for removing the seat. Preferably, the snap is provided on the portion of the strap extending under the seat.

At least one end of the strap may be manually releasably attached to the motorcycle frame. A coupling member is preferably interconnected with the strap. The coupling member may be, for example, a buckle having an opening therein. The buckle opening preferably includes a clearance portion and a retaining portion. Preferably, a bushing having a biasing member is mounted on the motorcycle, and is insertable into the clearance portion of the buckle opening. When the buckle is moved so that the biasing member is received within the retaining portion of the buckle opening, the biasing member resists movement of the buckle, and the seat is thus manually releasably attached to the frame by the strap. The biasing member may be, for example, a split ring constructed of spring steel.

The present invention also provides a method for installing a seat onto a motorcycle frame including a tubular backbone portion having an aperture. The method includes the steps of providing a seat having an insert member, inserting the insert member into the aperture in the backbone portion, and attaching a second portion of the seat to another portion of the motorcycle. Preferably, the method also includes the steps of providing a seat strap defining a loop, positioning a portion of the seat within the loop, inserting the insert member into the aperture in the backbone portion, and manually releasably attaching the strap to the frame. Preferably, the method further includes the steps of providing a coupling member having a retaining opening, attaching the coupling member to the strap, and mounting a biasing member on the frame. The step of manually releasably attaching the strap to the frame may include positioning the biasing member at least partially within the retaining opening.

Other features and advantages of the invention will become apparent to those skilled in the art upon review of the following detailed description, claims, and drawings.

BRIEF DESCRIPTION OF THE DRAWINGS

FIG. 6 is a cross-sectional view taken along line 6—6 in FIG. 3.

FIG. 7 is an enlarged side elevational view of the buckle and bushing.

FIG. 8 is a cross-sectional view taken along line 8—8 in FIG. 7.

FIG. 9 is an exploded view of the bushing assembly and the buckle.

FIG. 10 is a cross-sectional view taken along line 10—10 in FIG. 3.

FIG. 11 is a cross-sectional view taken along line 11—11 in FIG. 3.

Figure 1:
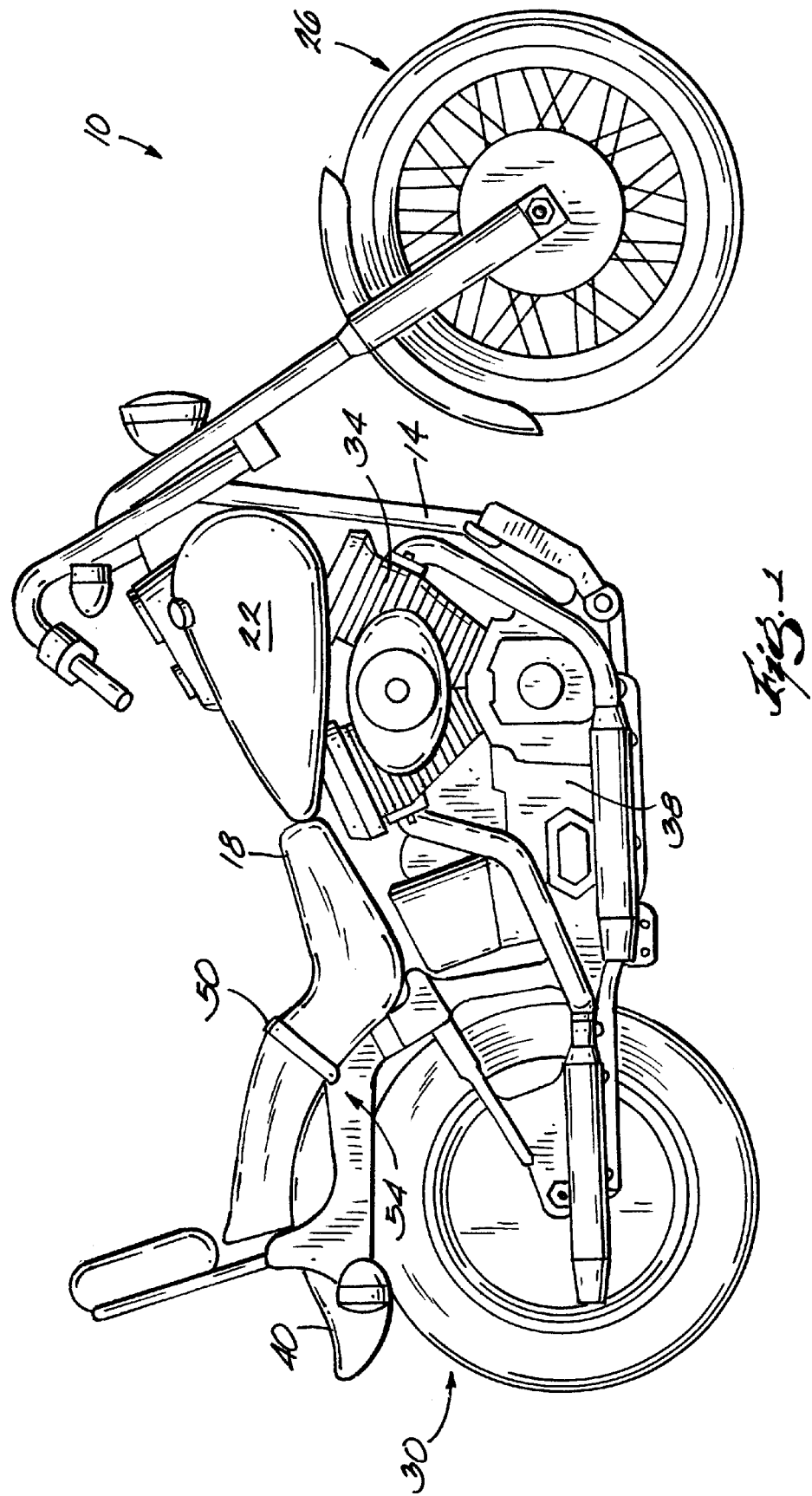
FIG. 1 is a right side elevational view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

Figure 2:
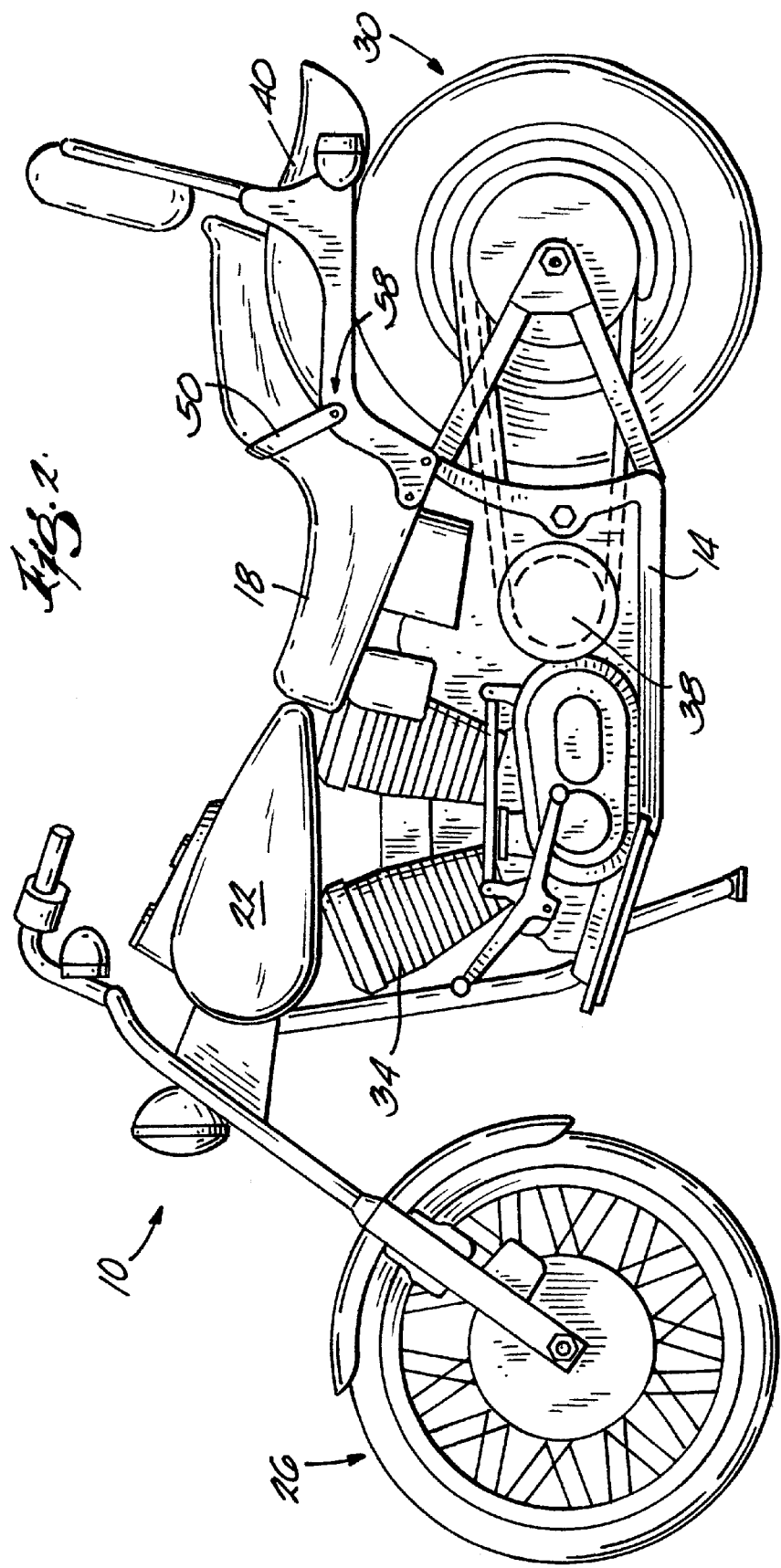
FIG. 2 is a left side elevational view of the motorcycle.

FIGS. 1 and 2 illustrate a motorcycle 10 including a frame 14. Mounted to the frame 14 are a seat 18, a fuel tank 22, front and rear wheel assemblies 26, 30, an engine 34, and a transmission 38. The rear wheel assembly 30 includes a fender 40. The illustrated engine 34 is V-twin internal combustion engine having first and second cylinders. The invention may, however, be embodied in a motorcycle having any suitable engine, such as a single cylinder engine or a multiple cylinder in-line engine.

Figure 3:
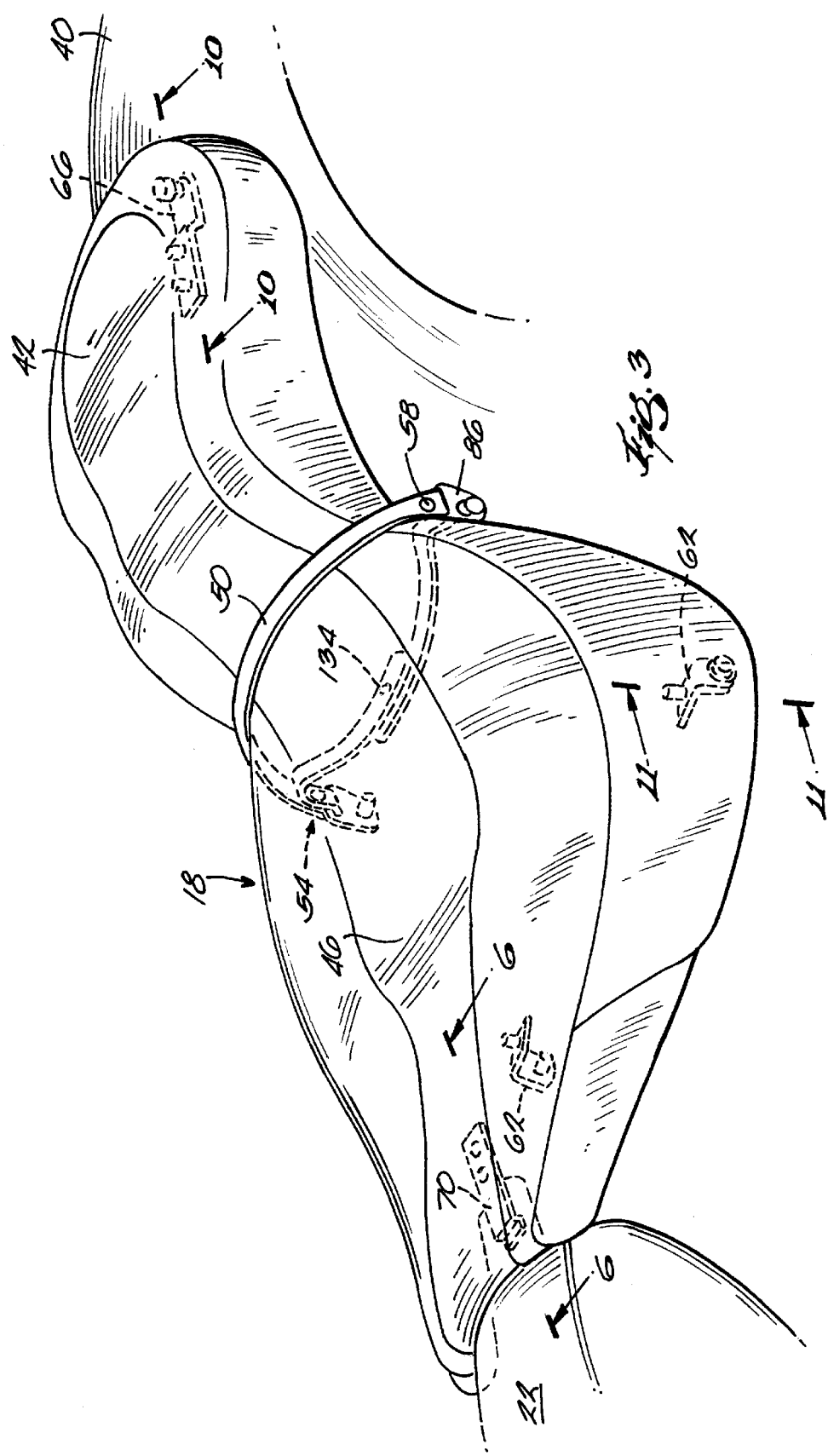
FIG. 3 is an enlarged perspective view of the motorcycle seat.

Referring to FIG. 3, the illustrated seat 18 includes a rear portion 42 and a front portion 46. The front portion 46 may accommodate the rider of the motorcycle 10, and the rear portion 42, which may be a removable pillion, may accommodate a passenger or the rider's baggage. A seat strap 50 defines a loop that extends around the seat 18 between the rear and front portions 42, 46. The loop is defined by upper and lower portions of the straps that extend over and under the seat 18, respectively. The upper and lower portions may be joined by any suitable means, such as stitching or riveting. A fixed end 54 of the seat strap 50 is fixedly mounted to the frame 14 on the right side of the motorcycle 10 (see also FIG. 1). A free end 58 of the seat strap 50 is manually releasably attached to the frame 14 on the left side of the motorcycle 10 (see also FIG. 2) as described below. As used herein, "manually releasably attached" means attachable and unattachable by hand and without the use of tools.

The seat strap 50 could alternatively consist of a single strap that extends from one side of the seat 18, across the top of the seat 18 only, and that is manually releasably attached to the frame 14 on the opposite side of the seat 18. It is preferred, however, to use a strap 50 defining a loop around a portion of the seat 18.

Two side mounting brackets 62 are mounted to the underside of the seat 18 with fasteners. A rear bracket 66 is mounted to the underside of the rear portion 42 with fasteners. An insert member (e.g., a tongue member 70) is mounted to the underside of the front portion 46 of the seat 18 with fasteners.

Figure 4:
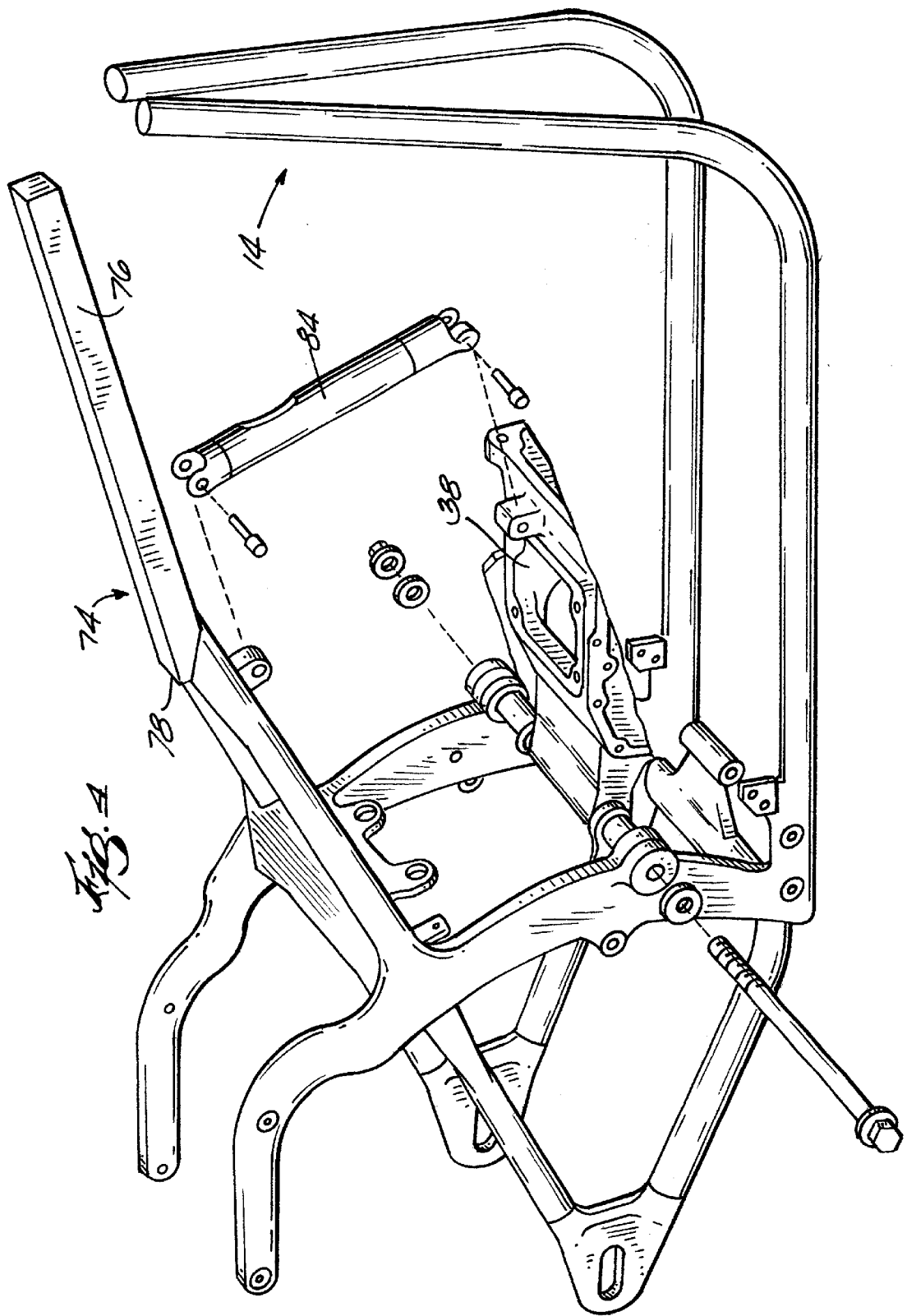
FIG. 4 is a perspective view of the motorcycle frame with most components of the motorcycle removed or partially cut away for the purpose of illustration.
Figure 5:
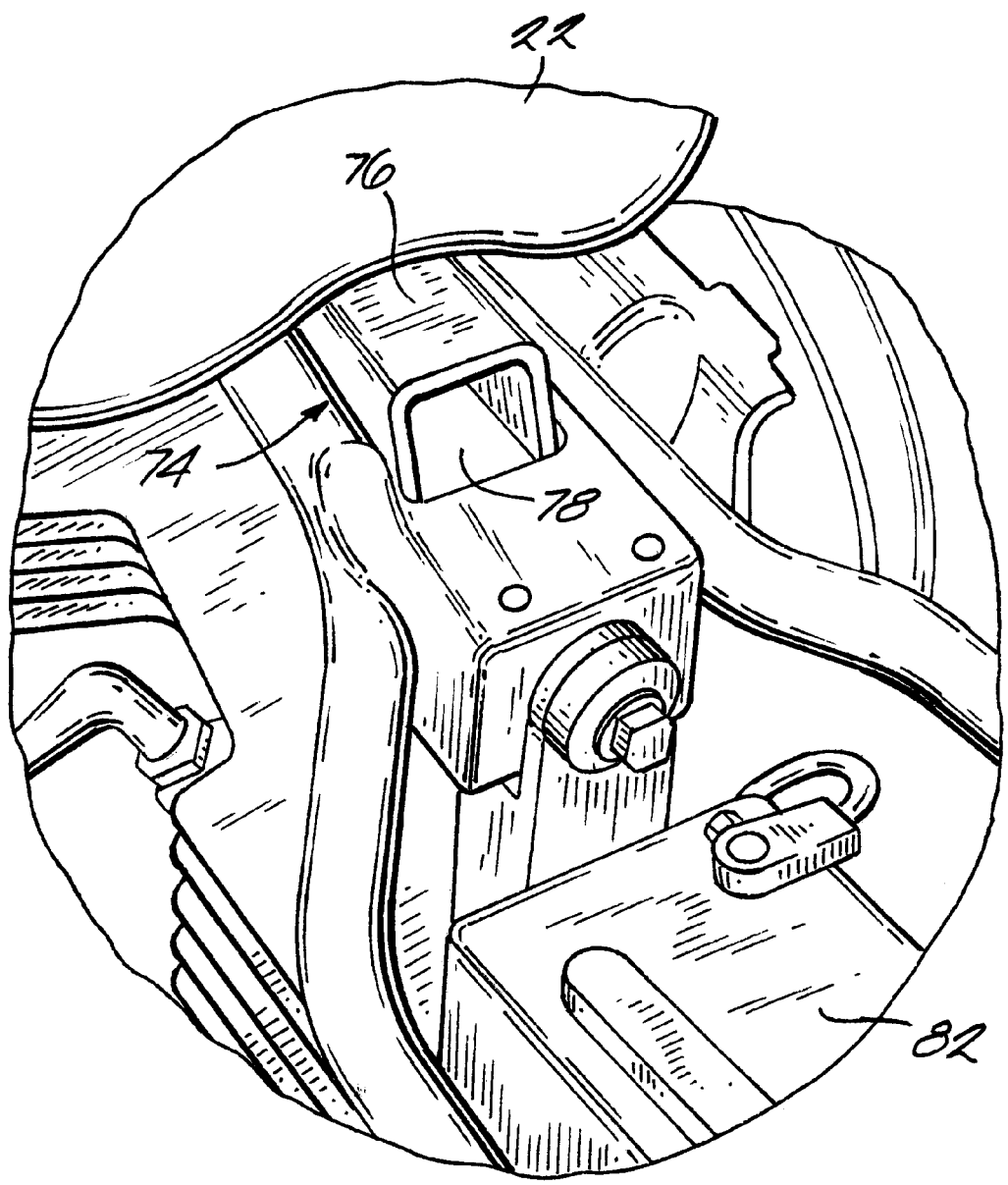
FIG. 5 is a view of a portion of the motorcycle with the motorcycle seat removed.

With reference to FIGS. 4–6, the motorcycle frame 14 includes a backbone or upper portion 74 extending rearward of the gas tank 22. The backbone portion 74 includes a hollow tubular portion 76 having an aperture 78 sized to receive a portion of the tongue member 70. The hollow tubular portion 76 is a load-carrying member of the frame 14, and therefore performs a structural function in addition to receiving the tongue member 70. When in the operating position shown in FIGS. 3 and 6, the tongue member 70 is inserted into the aperture 78, and upward movement of the seat 18 is substantially prevented by the backbone 74. Of course, the tongue member 70 may be provided virtually anywhere on the seat 18, provided it is inserted into the frame 14 or another structural portion of the motorcycle 10 to substantially prevent movement of the seat 18 with respect to the motorcycle 10.

In the operating position, the seat 18 covers the motorcycle's battery 82 (FIG. 5) and other components of the motorcycle (e.g., fuses, tool compartment, etc.). One or more bumpers may be provided on the undersurface of the seat 18 to hold the battery 82 in place. In this regard, a separate battery strap is not needed.

A seat post 84 (FIG. 4) joins the transmission 38 to the backbone 74 of the frame 14. When the seat 18 is in the operating position, the seat post 84 provides a classic look that is often desirable among motorcycle riders and enthusiasts. The seat post 84 gives the impression of a traditional seat post extending from the seat 18 down to the lower portion of the frame 14 as in some classic motorcycle designs.

Referring now to FIGS. 7–9, a coupling member (e.g., a buckle 86) is attached to the free end 58 of the strap 50. The buckle 86 includes a slot 90 through which the end of the strap 50 extends. The buckle 86 also includes a rivet hole to accommodate a rivet 94 that extends through the strap 50 on each side of the buckle 86 and secures the buckle 86 to the strap 50. The buckle 86 also includes a buckle opening that includes an enlarged clearance portion 100 and a reduced retaining portion 104. The illustrated buckle opening is a closed opening. As used herein, "closed opening" mean that the opening is surrounded by a continuous, unbroken edge.

Preferably, the clearance portion 100 consists of a portion of a circular hole having a diameter of between 0.667 and 0.672 inches, and the retaining portion 104 consists of a portion of a circular hole having a diameter of between 0.562 and 0.567 inches. Preferably, the respective centers of the circular holes defining the clearance and retaining portions 100, 104 are spaced from each other between 0.282 and 0.280 inches.

The coupling member may be provided in other forms than that shown in the drawings. For example, the coupling member may be a hook or loop. Also, the buckle opening may not be a closed opening, but may rather be an open slot or an opening that is not entirely enclosed within the coupling member.

Referring now to FIGS. 8 and 9, a bushing 108 is mounted to the motorcycle frame 14. The bushing 108 includes a bolt 112 having an enlarged head and a threaded end, a boss having a base portion 116 and a cylindrical portion 120, and defining a bore 124, and a biasing member (e.g., a split ring 128 constructed of spring steel). The split ring 128 fits around the cylindrical portion 120 of the boss, and the bolt 112 extends through both the split ring 128 and the bore 124 of the boss. The bolt 112 is secured to the frame 14 with a nut 132. The head of the bolt 112 is wide enough to retain the split ring 128 on the boss.

The split ring 128 is biased toward the first condition shown in FIG. 9, in which the ends of the split ring 128 are separated and the split ring 128 has a maximum radius. The outer diameter of the cylindrical portion 120 of the boss is selected to permit the ends of the split ring 128 to move toward each other to a second condition. The ends of the split ring 128 may or may not contact one another in the second condition.

The clearance portion 100 of the buckle opening is sized to fit over the bolt head and surround the split ring 128 while the split ring 128 is in the first condition. The retaining portion 104 is sized such that when it surrounds the split ring 128 it forces the ring 128 into the second condition. When the ring 128 is in the second condition, it provides a biasing force in a radial direction against the retaining portion 104 of the buckle opening, thereby retaining the bushing 108 within the retaining portion 104. The seat 18 provides a resilient biasing force due to its cushion that pulls the strap 50 and buckle 86 upwardly as shown in FIGS. 7 and 8 so that the buckle 86 is biased to receive the bushing 108 in the retaining portion 104 of the buckle opening. The free end 58 of the seat strap 50 is manually releasably attached to the frame 14 by positioning the split ring 128 within the clearance portion 100 and then moving the buckle 86 so that the split ring 128 is positioned in the retaining portion 104.

As seen in FIG. 3, the seat strap 50 may also include one or more optional manually releasable loop-tightening members (e.g., a snap 134, a buckle, or a hook-and-loop fastener). The illustrated snap 134 permits a length of the lower portion of the strap 50 to be doubled over on itself and snapped together. This reduces the size of the loop defined by the strap 50, and causes the loop to fit snugly about a portion of the seat 18. When it is desired to remove the seat 18, the snap 134 may be manually undone, by hand and without tools, to provide a wider loop through which the seat 18 may be removed. The snap 134 is preferably used on motorcycles having large seats. Additionally, because the snap 134 is on the lower portion of the strap 50, it does not compromise the strength of the upper portion of the strap 50. A force pulling on the upper portion of the strap 50, such as a rider holding on to the strap 50 during sudden braking of the motorcycle 10, would be borne substantially entirely by the upper portion of the strap 50. In this regard, the rivet 94 transfers force applied through the upper portion of the strap 50 to the buckle 86, which in turn applies the force to the frame 14. The lower portion of the strap 50 is therefore separated or isolated from tensile forces in the upper portion by the rivet 94.

FIGS. 10 and 11 illustrate the rear and side brackets 66, 62, respectively, that are used to further secure the seat 18 to the frame 14 and the rear fender 40. Extending through each bracket 62, 66 is a thumb screw 142 that is rotatable by hand without the use of tools. When the seat 18 is properly positioned on the motorcycle frame 14, the thumb screws 142 align with threaded bosses in the frame 14 and fender 40. In this regard, the seat 18 is manually releasably attached to the frame 14 and fender 40 by way of the thumb screws 142 and brackets 62, 66. A spring 146 biases the thumb screws 142 to substantially prevent them from loosening due to vibrations caused by the operation of the motorcycle 10. In the event that the rear portion 42 of the seat 18 is removed, for example, when the rear portion 42 is a removable pillion, the side brackets 62 and thumb screws 142 provide sufficient anchoring for the seat 18 without the rear bracket 66 and thumb screw 142.

The seat 18 is easily and quickly attached to the motorcycle frame 14 by inserting the seat 18 into the loop defined by the seat strap 50, snapping the halves of the snap 134 together if the optional snap 134 is provided, inserting the tongue member 70 into the aperture 78 in the frame backbone 74, manually threading the thumb screws 142 into the threaded bosses of the frame 14 and fender 40, and manually releasably attaching the buckle 86 to the bushing 108 as described above. When access to the motorcycle's battery 82 or any other component under the seat 18 is desired, the seat 18 is removed by reversing the method for attaching it to the frame 14 and fender 40. The seat 18 does not have to be entirely removed from the strap 50 to access the motorcycle components below the seat 18. Rather, the seat 18 may be hung to the side of the motorcycle 10 within the loop of the seat strap 50.

What is claimed is:

1. A motorcycle comprising:
   a frame including a tubular portion providing structural support to the motorcycle and having an aperture;
   a seat having an insert member that is positioned in said aperture in said tubular portion; and
   a strap extending over said seat to at least partially substantially fix said seat with respect to said frame, at least one end of said strap being manually releasably attached to said frame.

2. The motorcycle of claim 1, wherein said seat includes an undersurface, and wherein said insert member is mounted to said undersurface of said seat.

3. The motorcycle of claim 1, wherein a portion of said strap extends under a portion of said seat.

4. The motorcycle of claim 1, wherein said strap defines a closed loop surrounding a portion of said seat.

5. The motorcycle of claim 4, wherein said portion of said strap extending under a portion of said seat includes a loop-tightening member permitting said loop to be tightened around a portion of said seat.

6. The motorcycle of claim 1, further comprising:
   a coupling member interconnected with said strap and defining an opening having a clearance portion and a retaining portion; and
   a biasing member deflectable between a first condition and a second condition, said biasing member being biased toward said first condition;
   wherein said strap is manually releasably attached to said frame by positioning said clearance portion of said opening at least partially around said biasing member with said biasing member in said first condition, and then moving one of said biasing member and said coupling member to position said biasing member at least partially into said retaining portion with said biasing member in said second condition.

7. The motorcycle of claim 6, wherein said biasing member includes a split ring constructed of spring steel.

8. A motorcycle comprising:
   a frame;
   a seat; and
   a seat strap including at least one end that is manually releasably attached to said frame such that when said end is attached to said frame, said seat is at least partially substantially secured to said frame, and when said end is unattached from said frame, said seat is removable from said frame.

9. The motorcycle of claim 8, wherein said strap includes an upper portion extending over a portion of said seat, and a lower portion extending under a portion of said seat.

10. The motorcycle of claim 8, wherein said seat includes an insert member, and wherein said frame includes a tubular backbone portion having an aperture, said insert member being at least partially positioned in said aperture.

11. The motorcycle of claim 8, further comprising:
a coupling member interconnected with said strap and defining a retaining portion; and
a biasing member mounted to said frame and movable between a first condition and a second condition, and biased toward said first condition;
wherein said strap is manually releasably attached to said frame by positioning said biasing member at least partially within said retaining portion in said second condition.

12. The motorcycle of claim 11, wherein said biasing member is a split ring constructed of spring steel.

13. The motorcycle of claim 11, wherein said coupling member includes a clearance portion sized to at least partially receive said biasing member in said first condition.

14. The motorcycle of claim 13, wherein said coupling member has a closed opening including said clearance and retaining portions.

15. A method for installing a seat onto a motorcycle frame including a tubular backbone portion having an aperture, the method comprising the steps of:
providing a seat having an insert member;
providing a seat strap;
inserting the insert member into the aperture;
attaching a second portion of the seat to another portion of the motorcycle, including manually releasably attaching the strap to the frame; and
extending a portion of the strap across a portion of the seat.

16. The method of claim 15, further comprising the steps of:
providing a coupling member having a retaining portion;
attaching the coupling member to the strap;
providing a biasing member movable between a first condition and a second condition, and biased toward the first condition; and
mounting the biasing member on the frame;
wherein said manually releasably attaching step includes positioning the biasing member at least partially in the retaining portion in the second condition.

17. The method of claim 16, wherein said providing a coupling member step includes providing a coupling member having an opening including a clearance portion and the retaining portion, and wherein said manually releasably attaching step includes positioning the biasing member at least partially within the clearance portion in the first condition before positioning the biasing member at least partially within the retaining portion in the second condition.

18. The method of claim 15, wherein said providing a seat strap step includes providing a seat strap defining a loop, the method further comprising the step of positioning a portion of the seat within in the loop.

* * * * *